Patented Sept. 12, 1933

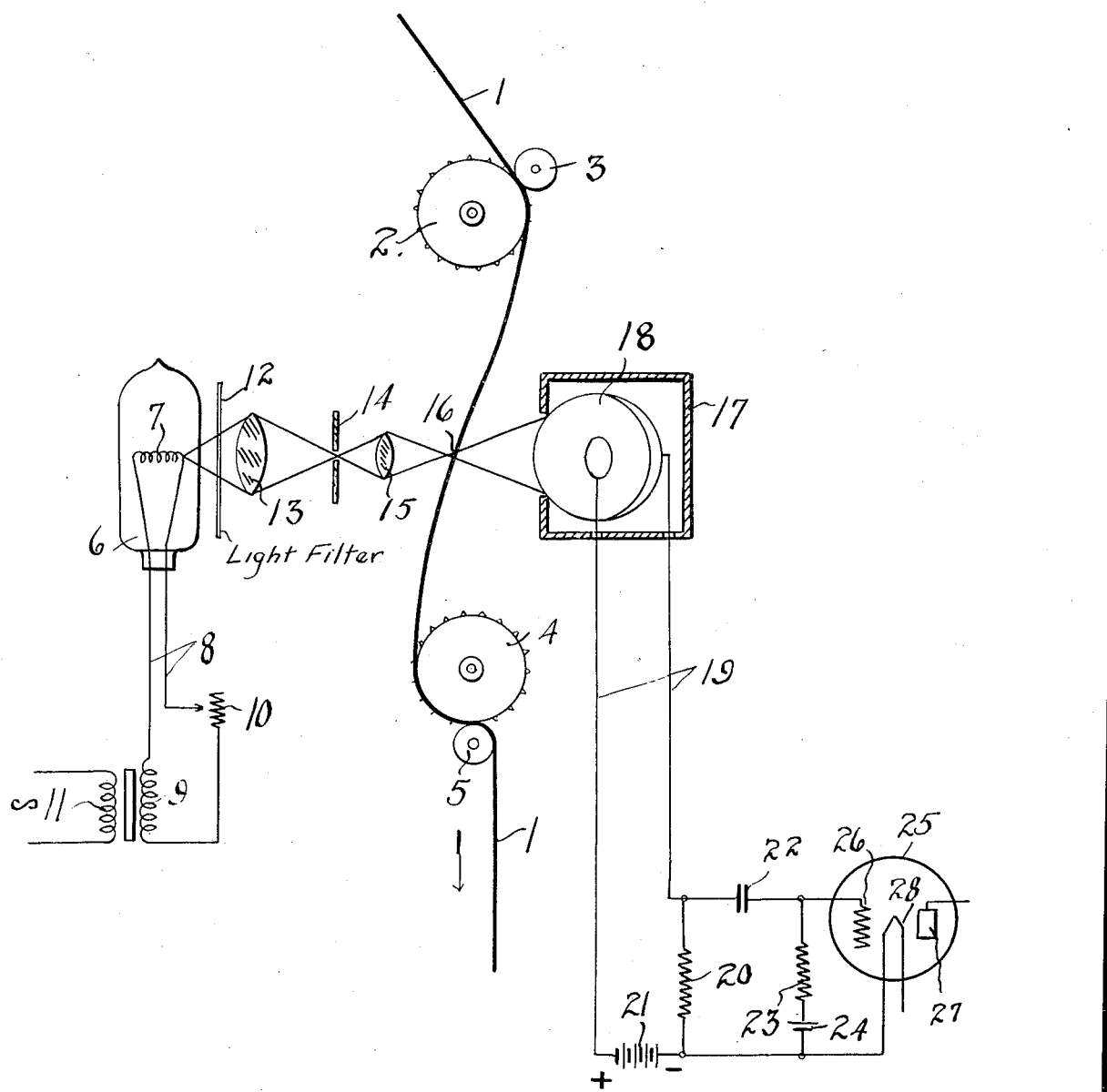

1,926,832

UNITED STATES PATENT OFFICE 1,926,832

METHOD OF AND APPARATUS FOR ELIMINATING UNDESIRABLE LIGHT FLUCTUATIONS

Isaac H. Barkey, Brooklyn, N. Y., assignor to General Talking Pictures Corporation, New York, N. Y., a corporation of Delaware Application July 2, 1929. Serial No. 375,423

12 Claims. (Cl. 179—100.3)

This invention relates in particular to improvements in talking motion picture apparatus of the type employing a sound record on the picture film.

One of the objects of the invention is to arrange the exciting lamp so that it may be operated directly by alternating currents or fluctuating currents.

A further object of the invention is the provision of fixed or stationary media between the exciting lamp and the photo-electric cell to prevent the transmission of light fluctuations due to the use of alternating current for energizing the exciting lamp.

A further and basic object is the development of a method for securing one or more bands of relatively constant light from a source which is fluctuating to the extent of becoming otherwise unsuitable for the specific applications.

A further object of the invention is the provision of media between the illuminating source of a light valve recorder and unexposed emulsion so as to render the impinged light equivalently free from undesirable fluctuations.

These and other objects as will appear from the following description are secured by means of this invention.

This invention resides substantially in the steps and combinations of steps, the combination, arrangement and relative location of parts, all as will be described more fully hereinafter.

Referring to the drawing the single figure is a diagrammatic illustration of an arrangement by means of which the objects of this invention are obtained.

This invention relates to improvements and apparatus for reproducing sound from photographic sound records on motion picture films.

It is the present practice to use for the exciting lamp, the rays of which are projected through the sound record on the film and fall upon a photo-electric cell, direct current of suitable amperage. Present feeder equipment for talking motion pictures requires for this purpose a lamp which consumes 4 to 8 amperes. Heretofore it has been necessary to use a direct current source for energizing this lamp for the reason that when an alternating current is used the light fluctuations are reproduced through the photo-electric cell and cause a loud humming sound in the sound reproducers. A proper rectifier and electric filter in the circuit for supplying current to the lamp would be both clumsy and expensive. It is difficult on the other hand to keep batteries charged for lighting this lamp on account of the heavy current drain. Moreover, such batteries are frequently neglected and not maintained properly charged.

By means of the apparatus and method of this invention, alternating current may be supplied for energizing the exciting lamp without producing any noticeable or objectionable hum in the sound reproducers. By the use of proper dispersing, diffracting or selective media, such as colored films (i. e., sound tracks appropriately colored and used with or without additional filters) or their combination the light from such a lamp, energized by alternating current may be broken up, dispersed, or the peaks of illumination eliminated, so that the light passing through the said combination, and falling upon the photo-electric cell, is practically a steady light without fluctuations, except those which are produced by the passage of the light beam through the photographic sound record on the film. These fluctuations are of course necessary and must be impressed upon the photo-electric cell in order to reproduce the desired sounds.

Among the dispersive, diffractive or selective media which may be employed for the purpose of this invention are ground glass, etched glass, milk glass, translucent paper, colored celluloid films, gelatin light filters, lenses which have been treated such as on one of their surfaces, and fine gratings both of the wire and the ruled types. In each instance the media are placed in a fixed position between the light source and the photoelectric cell. The location of the filter between the source of light and the photo-electric cell is not important, except that if paper, gelatin or celluloid is used, it must not be placed too near the lamp, so as to avoid destruction thereof by the intense heat radiated from the lamp at present in general use.

A gelatin filter as disclosed above has the property of cutting off light of wave lengths of less than 0.5 micron.

The use of such media when introduced between the lamp and the ordinary film accomplishes in conjunction with the optical system an almost complete elimination of halation upon the film surrounding the margin of the slit image which is projected upon the film. Halation from an unobstructed bright source of light ordinarily results in a lack of clarity of the reproduced sound, due to the fact that the image of the slit upon the sound record is no longer sharply defined or confined within the intended dimensions which is ordinarily about 0.001" in width. The brightest image still remains of this width, but on either side thereof a halo is produced. This additional light flux is also picked up by the photo-responsive device with a consequent impairment of the frequency and amplitude factors of reproduction. Such halation on the film, therefore, results in a more or less troublesome lack of clarity of such reproduction. Thus the use of media in accordance with this invention minimizes halation, sharpening the defined image of the slit on the film, and permits the use of an alternating current for energizing the lamp.

By the use of a monochromatic band of the spectrum as a light, the variations in voltage of a photoelectric cell adapted to it will be a true representation of the frequency changes as caused by the sound track impressions on the moving film. This incidently eliminates a theoretical defect of the variable density method of sound track reproduction.

In this connection, it may be well to point out clearly the ideas expounded in United States Patent No. 1,590,185 of 1926 to Engl et al. and to show its dissimilarity to the present disclosure. Let $S/\frac{\lambda b}{\lambda a}$ =light source with dominant emission in the spectral band $\lambda b - \lambda a$ $P/\frac{\lambda b'}{\lambda a'}$ =photocell having a dominant response in the spectral band $\lambda b' - \lambda a'$ $E/\frac{\lambda b''}{\lambda a''}$ =sound track having a maximum transparency gradient in the spectral band $\lambda b'' - \lambda a''$ Then, for maximum percentage modulation $$a \equiv a' \equiv a'', \ b \equiv b' \equiv b''$$

This last pair of identities is what characterizes the Engl patent and differentiates it from others. Such filters as are used are intended to adjust matters so that the above pair of identities will be satisfied. It is not the use of filters, but their application to produce specific results as revealed in the patent which is claimed.

This invention differs radically from Engl's in that the stipulations are:

Let $S/\frac{\lambda \beta}{\lambda \alpha}$ =light source covering the spectral range $\lambda \beta - \lambda \alpha$, having intensity characteristics varying in an arbitrarily fixed way between $i(\lambda \alpha)$ and $i(\lambda \beta)$ $P/\frac{\lambda \beta'}{\lambda \alpha'}$ =photo-cell having equivalently continuous and effective response characteristics in the spectral band $\lambda \beta' - \lambda \alpha'$ $Ms$=photo-electric modulation resulting from the fluctuating light source $Mr$=photo-electric variation resulting from modulating the light beam Then if $(\lambda \beta - \lambda \alpha)$ and $(\lambda \beta' - \lambda \alpha')$ have a section in common, it is generally possible to choose light modifying media which when interposed between said light source and photo-cell render the ratio $R = Ms/Mr$ less than a stipulated amount $Ro$.

Thus in conclusion, this invention, in contradistinction to Engl's, is characterized by $$Ro > R = Ms/Mr$$

The effectiveness of the light filtering action accomplished by this invention is apparently due to the fact that the peaks of the alternating current fluctuations through the lamp filament produce a momentary and intense emission of light which is particularly rich in the shorter wave lengths of the spectrum, that is in the blues, violets, and ultra-violet rays. For the greater part of the time during the alternating current cycle, however, the filament is not as intensely heated as it is during the peaks of the alternating current cycle, and during this longer period the greater part of the illumination from the filament lies in the red, yellow, i. e., longer wave lengths of the spectrum. In other words the intensely heated filament retains a certain degree of heat throughout the periods of no current or current reversal, during which period the illumination remains practically constant because the filament cannot cool off sufficiently during the short intervals of low current values, or of current reversals.

The very intense heat and light radiated during the peaks of the current waves, however, are subject to greater fluctuation because the filament will cool off to its average value during the time intervals between successive current peaks. If, therefore, we introduce media, which while transmitting best the average illumination, in whole cuts out the shorter wave lengths existent only during the peaks of said current waves, a practically constant source of illumination of the photo-electric cell is thereby obtained without the intensity being too greatly reduced to hinder the proper modulation and volume-level of a properly designed amplifier.

The apparatus used in connection with this invention will now be described.

The photographic film having both the sound and picture record thereon is shown at 1, passing over a feed sprocket 2, and held in engagement therewith by the idler roller 3. A similar sprocket 4 and idler roller 5 are employed as shown, and spaced a short distance therefrom. By means of these sprockets and additional mechanical elements (not illustrated) which may be driven in unison the film is given a steady uniform movement at the point where the light from the exciting lamp passes through the sound record.

The exciting lamp is shown at 6, having the usual filament 7 energized by the wires 8 and the secondary 9 of a transformer. A resistance 10 is employed to control the amount of current flowing to the filament. The primary 11 of this transformer is supplied from a suitable alternating current source, such as the lighting circuit found in common use today. Interposed between the filament 7 and the photo cell 18 is the fixed or stationary color filter or dispersing media 12, which may be made of any of the materials disclosed above. A lens 13 is employed to focus the light upon a mechanical slit. A second lens 15 focuses an image of this slit on the film at the sound record portion as indicated at 16. The lens 13, slit 14 and the lens 15 constitute an optical system. On the other side of the film, and in the path of the light rays is a photo electric cell 18 placed within a light tight compartment 17. The wires 19 running from the photo-electric cell are connected to the grid 26 of the first amplifier tube 25 through a suitable condenser 22, and a suitable current source 21. A resistance 20 of the proper value is shunted across these leads on one side of the condenser and a biasing resistance 23 and battery 24 are connected between the grid 26 and the filament 28. The plate 27 is connected to the output circuit of this amplifier tube. The circuit for the photoelectric cell is of course old, and well known in this art, and it is of course apparent that more than one amplifier tube may be employed for the sound reproducers are connected thereto. By means of this arrangement the functions carefully described above are secured. Briefly the reduction of halation and the permissible use of alternating current for energizing the lamp are accomplished. I am of course well aware that the principles of construction and operation of this invention may assume other physical forms, and I do not, therefore, wish to be strictly limited to my illustrated disclosure, but prefer to be limited by the scope of the appended claims.

What I seek to secure by United States Letters Patent is:

1. In an apparatus of the type described, the combination comprising a light source, means for supplying alternating current thereto to energize it, a photo-electric cell and a light filter between the light source and the photo-electric cell having the characteristic of cutting off the light of shorter wavelengths emitted during intervals of intense emission of light from the light source at peak values of the fluctuating current.

2. In an apparatus of the type decribed, the combination comprising a filamentary light source, means for supplying alternating current thereto to energize it, a photo-electric cell and light filtering means interposed between the light source and the photo-electric cell to reduce the light intensity reaching the photo-electric cell at peak values of the alternating current.

3. In an apparatus of the type described the combination comprising a filamentary light source, means for supplying alternating current thereto to energize it, a photo-electric cell, and fixed means situated between the light source and the photo-electric cell essentially opaque to light waves of higher frequency from the light source produced by the alternating current supply thereto.

4. In an apparatus of the type described the combination comprising a light source, means for supplying alternating current thereto to energize it, a photo-electric cell adapted to receive light from said light source, and fixed means between the light source and the photo-electric cell for cutting off only the rays of light from the light source which are emitted chiefly during the intervals of maximum current.

5. In a system of the type described, the combination comprising an electric lamp having a filament, means for supplying an alternating current to the filament for energizing it, a photo-electric cell arranged to receive light from the light source, a photographic film having a sound record thereon, adapted to be moved between the light source and the photo-electric cell, a slit block between the light source and the film, means for focusing an image of the slit on the film, the means between the light source and the photo-electric cell for determining the maximum transmission of light from the light source to the photo-electric cell during peak values of light emission from the filament.

6. The method of impressing a substantially constant amount of light upon a photo-electric cell from a light source energized by alternating current which comprises passing the fluctuating light from the source through a light selective media which passes a substantially constant amount of light by absorbing the light of the shorter wave lengths produced during periods of intense excitation of the light source.

7. A method of filtering out undesirable fluctuations from an alternating current light source comprising the step of passing said light through fixed media which cuts off the light of shorter wave lengths emitted during the peak values of light emission.

8. In an apparatus of the type described, the combination comprising an electric lamp having a filament, means for supplying an alternating current to the filament for energizing it, a photo-electric cell arranged to receive light from the light source, a photographic film having a sound record thereon adapted to be moved between the light source and the photo-electric cell, means for focusing a configurated image on the film, and stationary means separate from the film between the light source and the photo-electric cell for effecting the transmission of a substantially constant amount of light from the light source to the photo-electric cell, the amount of light being emitted by the light source being variable by reason of its energization with alternating current.

9. In a system of the type described, the combination comprising an electric lamp having a filament, means for supplying an alternating current to the filament for energizing it, a photo-electric cell arranged to receive light from the lamp, a photographic film having a sound record thereon, adapted to be moved between the lamp and the photo-electric cell, means for focusing a configurated image on the film, and fixed means between the lamp and the photo-electric cell for effecting the transmission of a substantially constant amount of light from the lamp to the photo-electric cell, the amount of light being emitted by the lamp being variable by reason of its energization with alternating current.

10. In a system of the type described, the combination comprising an electric lamp having a filament, means for supplying an alternating current to the filament for energizing it, a photo-electric cell arranged to receive light from the light source, a photographic film having a sound record thereon, adapted to be moved between the light source and the photo-electric cell, means for focusing a configurated image on the film, and selective media between the light source and the photo-electric cell for effecting the transmission of a substantially constant amount of light from the light source to the photo-electric cell, the amount of light being emitted by the light source being variable by reason of its energization with alternating current.

11. A sound-on-film reproducing apparatus, including in combination an alternating electrical current source, an exciter lamp energized by said source, a photo-electric cell disposed to receive a beam of light from said lamp, a film having a sound track movable so that the sound track intercepts a beam of light from the lamp and through which the beam of light must pass before it impinges on the photo-electric cell, and a fixed amber filter between the lamp and film to intercept the light beam and absorb the light of the shortest wave lengths produced through the periods of intense excitation of the lamp.

12. A method of reducing undesirable variations in the output current of a light sensitive device, the said variations being produced by the flicker of an illuminating incandescent source fed by alternating current, which method comprises the step of excluding from the said light sensitive device that part of the radiation from the said incandescent source which is of relatively short wave length.

ISAAC H. BARKEY.